FIG. 1

INVENTOR
JACOB SCHMIER

BY Louis V Schiavo

ATTORNEY

Oct. 26, 1971  J. SCHMIER  3,614,810
MOLDING PRESS

Filed Feb. 25, 1969  6 Sheets-Sheet 4

INVENTOR
JACOB SCHMIER
BY
Louis V Schiavo
ATTORNEY

Oct. 26, 1971    J. SCHMIER    3,614,810
MOLDING PRESS

Filed Feb. 25, 1969    6 Sheets-Sheet 5

INVENTOR
JACOB SCHMIER
BY
*Louis V. Schiavo*
ATTORNEY

Oct. 26, 1971  J. SCHMIER  3,614,810
MOLDING PRESS

Filed Feb. 25, 1969  6 Sheets-Sheet 6

INVENTOR
JACOB SCHMIER

BY
Louis V Schiavo
ATTORNEY

United States Patent Office 3,614,810
Patented Oct. 26, 1971

3,614,810
MOLDING PRESS
Jacob Schmier, Allentown, Pa., assignor to Rodale
Manufacturing Company, Inc., Emmaus, Pa.
Filed Feb. 25, 1969, Ser. No. 806,776
Int. Cl. B30b 15/32
U.S. Cl. 18—16 F                    6 Claims

ABSTRACT OF THE DISCLOSURE

A molding press is provided with a stationary mold section and a movable mold section. The movable section carries mechanism operative when the mold is opened for ejecting a workpiece from the mold. Additional mechanism is arranged for projection into the mold cavity for forming a recess in the side of the workpiece and for being withdrawn from the mold cavity in time to permit ejection of the workpiece from the mold cavity. Latch mechanism, operable in response to opening and closing of the mold, is provided for suitably controlling means which receives work ejected from the mold and discharges it from the press.

BACKGROUND OF THE INVENTION

(1) Field of the invention

The present invention relates to molding presses for molding articles from powdered molding material.

(2) Description of the prior art

Prior art knockout, pullout and workpiece ejector mechanisms for molding presses have not proved to be entirely satisfactory principally because of difficulties experienced in arranging for operation thereof in predetermined timed relation to opening and closing of the mold.

SUMMARY OF THE INVENTION

The knockout mechanism operates in response to movements of the upper mold section and is characterized by the provision of means for yieldably supporting the knockout pins and arranged to effect suitable lost motion. The pullout mechanism operates in response to a fluid pressure motor in predetermined timed relation to operation of the bottom knockout pins. The workpiece ejector mechanism is moved from working to non-working position in response to movement of the feeder carriage and is releasably latched in such position by suitable means responsive to movements of the upper mold section. When unlatched, the workpiece ejector mechanism moves back to working position under the influence of gravity.

DESCRIPTION OF THE PREFERRED EMBODIMENT

The present invention is directed to the specific embodiment of the invention shown in the drawings. It is not addressed to the scope of the invention, which may be practiced in a variety of forms without departing from the spirit of the invention.

Figure 1:
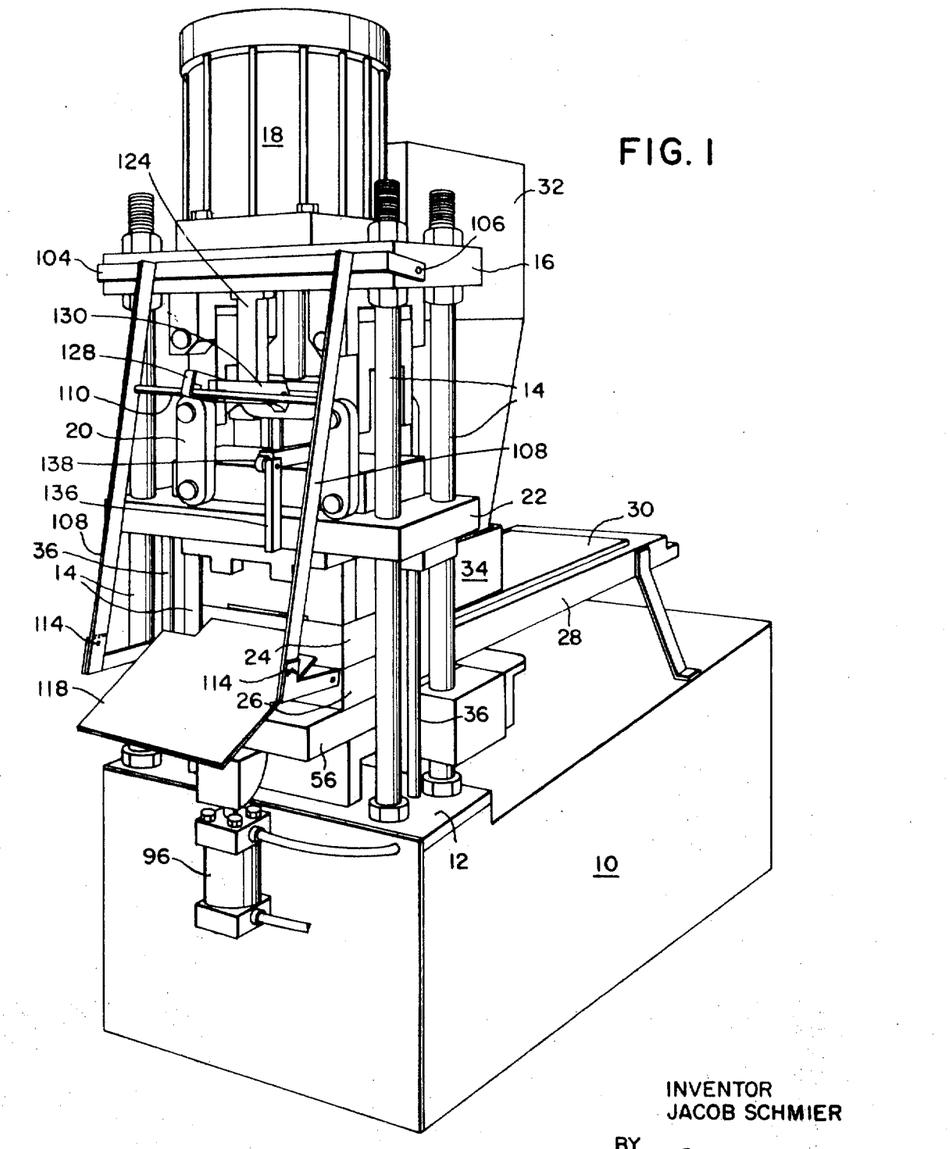
FIG. 1 is a perspective view of a molding press constructed in accordance with the invention.

A molding press of the type with which the invention is concerned comprises a main frame including a base section 10 mounting a plate 12. Extending upwardly from the base plate 12 are a set of four columns 14 carrying a top plate 16. The top plate 16 mounts a cylinder and piston fluid pressure motor 18 which actuates a toggle mechanism 20 underlying the top plate 16. Carried by the toggle mechanism 20 is a center plate 22 slidably mounted on the columns 14. Between the center plate and the base plate is an electrically heated mold including an upper mold section 24 depending from the center plate and a lower mold section 26 seated upon the base plate.

Overlying the base frame 10 is a feeder assembly including a carriage track 28 mounting a carriage 30. Overlying the carriage 30 is a hopper 32 and a powder pin 34.

The molding press of the present invention is generally similar in construction and operation to that shown and described in U.S. Pat. No. 2,582,891, issued to W. Strauss, on Jan. 15, 1952. Reference may be had to said patent for description of certain features of construction and operation not covered herein. It may be noted, however, that in the condition of the press shown in FIG. 1, the mold is closed and a charge of powdered material previously delivered to the mold is in the process of being pressed into shape and heat cured. The feeder carriage is retracted, and the feeder is being charged with a fresh load of powdered material from hopper 32 and bin 34. After the powder is pressed into shape and heat cured, the mold is opened, whereupon the workpiece is ejected from the mold by knockout pins. Then the feeder carriage moves forwardly, whereupon the workpiece is stripped from the knockout pins and the mold recharged with powdered material. The feeder carriage is then retracted to its initial position.

Figure 2:
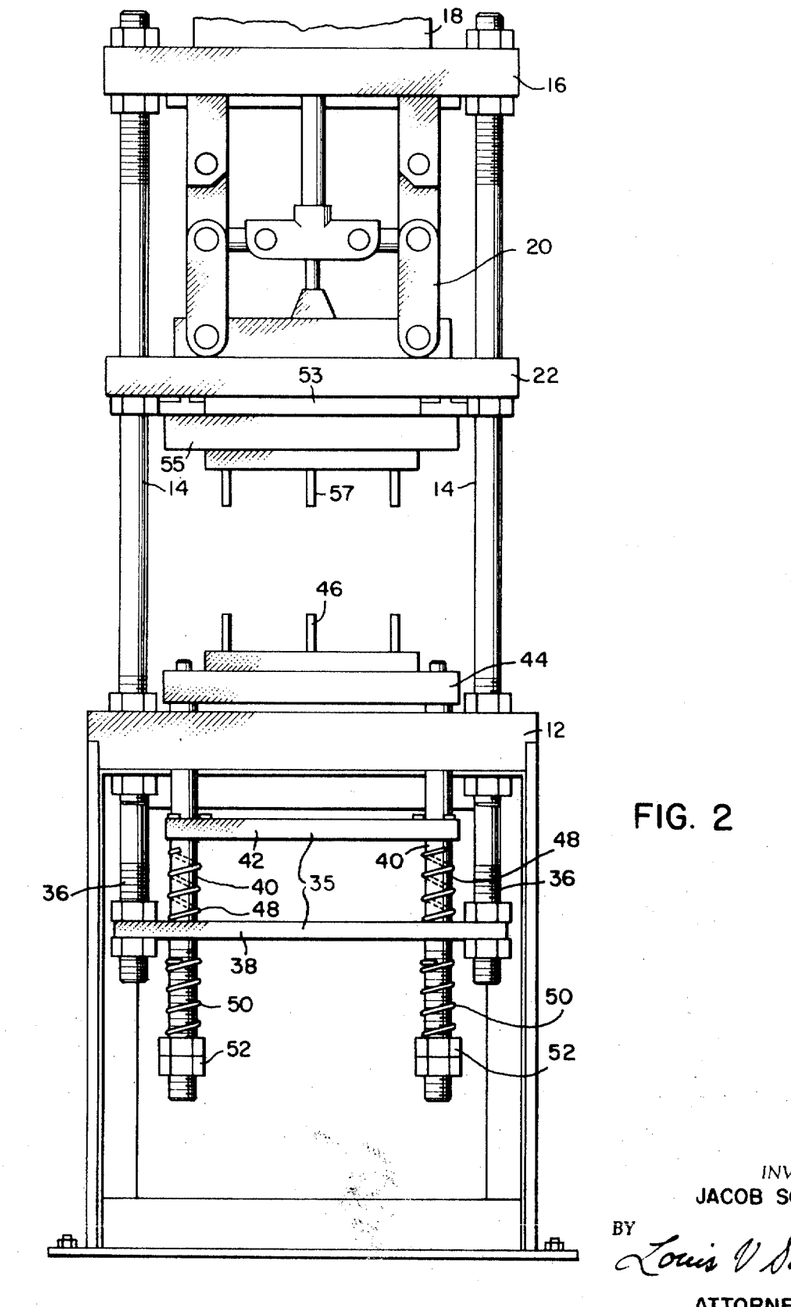
FIG. 2 is a front elevation of the molding press with the mold and other parts omitted to better expose the bottom knockout mechanism.
Figure 3:
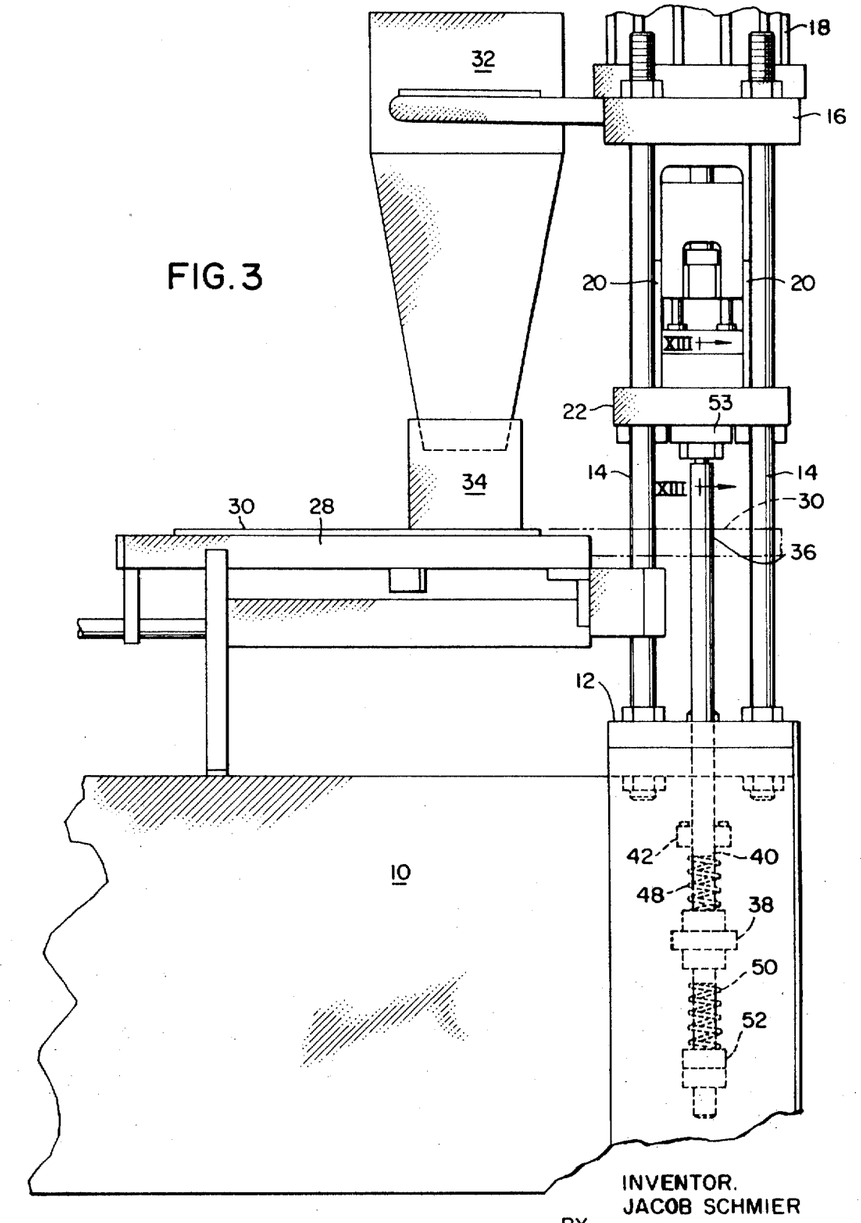
FIG. 3 is a fragmentary side elevation of the molding press, with parts omitted for the sake of clarity, and with the feeder carriage shown in retracted position (solid lines) and in advanced position (phantom)

Referring particularly to FIGS. 2 and 3, the molding press is provided with novel means for ejecting a workpiece from the lower mold section, including an auxiliary frame assembly, designated 35. Depending from the center plate 22 and slidably extending through the base plate 12 are a pair of laterally spaced rods or frame members 36, the lower end portions of which are interconnected by a horizontally extending bar or cross member 38. The rods 36 and bar 38 form a U-shaped section of the auxiliary frame assembly. Extending slidably through the bar 38 and the plate 12 are a pair of laterally spaced rods or frame members 40 intermediate portions of which are interconnected by a horizontally extending bar or cross member 42 and the upper end portions of which are interconnected by a horizontally extending knockout plate 44. The rods 40, bar 42 and plate 44 form an A-shaped section of the auxiliary frame assembly. Upstanding from the knockout plate 44 is a set of knockout pins 46, the number and arrangement of pins being optional. Extending respectively about the rods 40 are a pair of compression spring 48 seated upon the bar 38 and a pair of compression springs 50 seated upon nuts 52.

Figure 13:
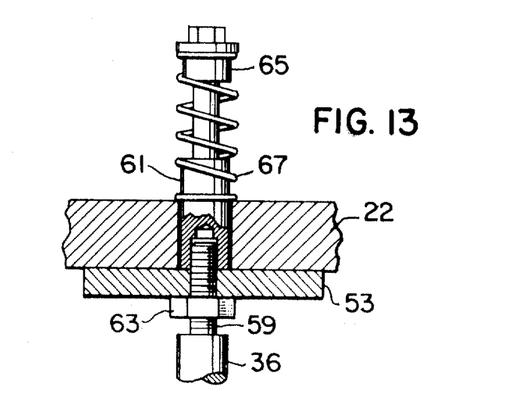
FIG. 13 is an enlarged section on lines XIII—XIII in FIG. 3.

Referring particularly to FIGS. 2, 3 and 13, the center plate 22 overlies a plate 53, which in turn overlies knockout plate 55. Depending from knockout plate 55 is a set of knockout pins 57 which extend downwardly into the upper mold section 24, the number and arrangement of pins being optional. Each rod 36 is provided with an upper end portion 59 threaded into the lower end portion of a member 61 which slidably extends through the plate 22. The plate 53 is held against the lower extremity of the member 61 by a nut 63 threaded onto the rod 36. Threaded onto the upper end portion of the member 61 is an element 65 which provides a seat for the upper end of a compression spring 67, the lower end portion of the spring being seated on the center plate 22. For bottom knockout operation, the plates 22 and 53 are fastened together.

Figure 14:
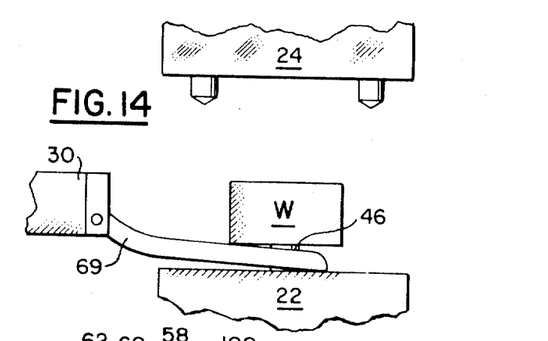
FIG. 14 is an enlarged view showing the mold open and the feeder carriage partially advanced and about to strip a workpiece from the knockout pins associated with the lower mold section.

In the condition of the press shown in FIGS. 1, 2 and 3, the center plate 22 is in lowered position and the mold closed, as a consequence of which the U-shaped section of the auxiliary frame comprising rods 36 and bar 38 is in its lowermost position. The A-shaped section of the auxiliary frame comprising rods 40, 42 and knockout plate 44 is carried by the base plate 12, the knockout plate 44 being seated upon the base plate 12. The pins 46 extend upwardly into the lower mold section 26. The springs 48 and 50 are unstressed. When the center plate 22 is raised to open the mold, it raises the U-shaped section, whereupon some lost motion occurs between the U-shaped section and the A-shaped section. Initially, the bar 38 raises the springs 48 until the upper ends thereof engage the bar 42. Then as the upward movement continues, the springs 48 are compressed between the bars 38 and 42, and finally the A-shaped section is raised. As a consequence, the pins 46 move upwardly relative to the lower mold section as required to eject a workpiece from or knock the same out of the lower mold section 22. At the same time (see FIG. 14), the feeder carriage 30 moves forwardly, carrying a rake member 69, the fingers of which extend downwardly and forwardly. As the rake member advances, the fingers thereof straddle the knockout pins 46 and strip the workpiece W from the knockout pins. The feeder carriage continues to advance and as it approaches the end of its traverse, it registers with the lower mold section and reloads the same with a fresh charge of powdered material. In advancing from the position shown in FIG. 14 the feeder carriage passes over the knockout pins 46.

Immediately after the mold is reloaded, the feeder carriage is retracted to its initial position for receiving another load of powdered material for use in the next machine cycle.

When the center plate is lowered to reclose the mold, it lowers the U-shaped section, whereupon some lost motion occurs again. Initially, the A-shaped section remains in raised position, being supported on the springs 48 as they are progressively stressed-relieved due to lowering of the bar 38. The bar 38 continues to move downwardly after the springs 48 are fully expanded and finally engages the upper ends of the springs 50, as a consequence of which the springs 50 are compressed between the bar 38 and the nuts 52, and the A-shaped section is lowered to its initial position.

As indicated hereinbefore, the plates 22 and 53 are fastened together for bottom knockout operation, but not for top knockout operation. Furthermore, for top knockout operation, the rods 40 are not fastened to the knockout plate 44, but instead are free to move up and down independently thereof. As described hereinbefore in connection with bottom knockout operation, when the center plate 22 is raised to open the mold, it raises the U-shaped section, whereupon some lost motion occurs between the U-shaped section and the A-shaped section. Initially, the bar 38 raises the springs 48 until the upper ends thereof engage the bar 42. Then as the upward movement continues, the springs 48 are compressed between the bars 38 and 42, and finally the A-shaped section is raised until the bar 42 engages the plate 12. When the bar 42 engages the plate 12, upward movement of the U-shaped section, plate 53 and upper mold section 24 terminates. However, upward movement of the center plate 22 continues against the influence of springs 67. Thus upper mold section 24 moves upwardly relative to pins 57 as required to eject a workpiece from or knock the same out of the upper mold section. When the center plate is lowered to reclose the mold, the auxiliary frame is not affected immediately for the springs 67 expand, maintaining the auxiliary frame in raised position against the influence of springs 48. Thus upper mold section 24 moves downwardly relative to pins 57 as required to retract the same. Thereafter the center plate 22, upper mold section 24, plate 53, knockout plate 55, pins 57 and the U-shaped section move downwardly together as a unit. As described hereinbefore in connection with bottom knockout operation, initially the A-shaped section remains in raised position, being supported on the springs 48 as they are progressively stress-relieved due to lowering of the bar 38. The bar 38 continues to move downwardly after the springs 48 are fully expanded and finally engages the upper ends of the springs 50, as a consequence of which the springs 50 are compressed between the bar 38 and the nuts 52, and the A-shaped section is lowered to its initial position.

It will be noted that operation of the knockout mechanism is in response to opening and closing of the mold. However, for improved operation of the knockout pins, operation of the knockout mechanism is modified by providing lost motion between the U-shaped section and the A-shaped section, and by "floating" the A-shaped section on springs carried by the U-shaped section.

Figure 4:
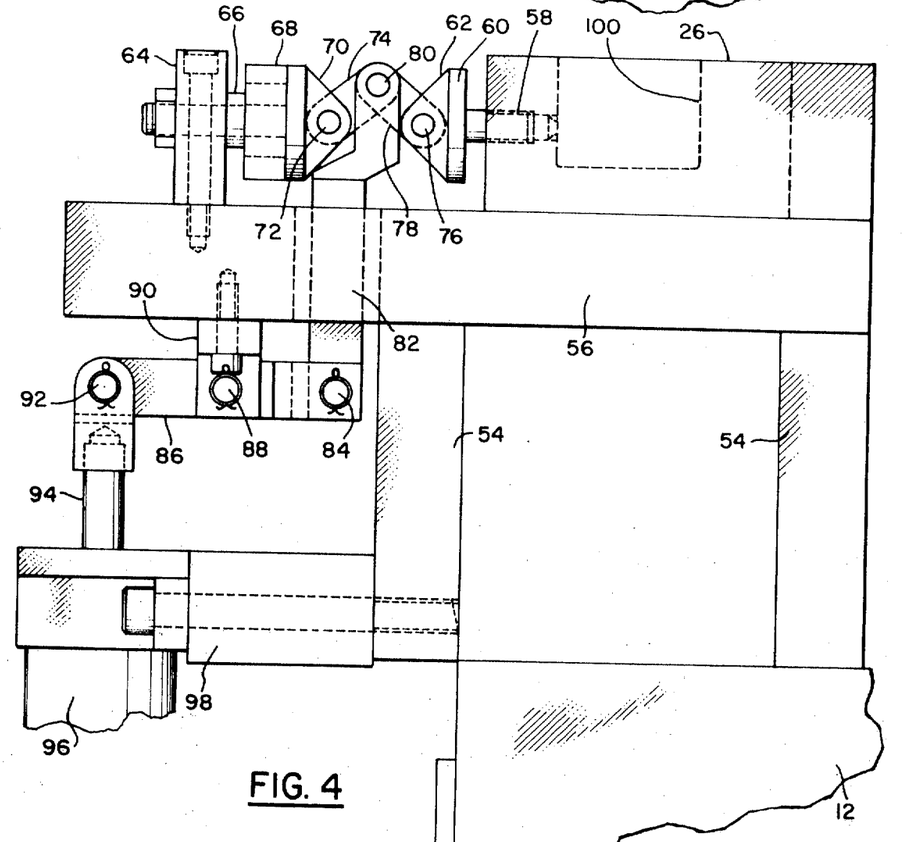
FIG. 4 is a side view of the pullout mechanism, the pullout pin being shown in retracted position.

Referring particularly to FIG. 4, the molding press is also provided with novel means for forming a recess in the side of a workpiece. Mounted upon the base plate 12 are laterally spaced plates 54 carrying a horizontally extending plate 56 upon which is mounted the lower mold section 26. Slidably fitted into one side of the mold section 26 is a pin 58 extending from a member 60 provided with a pair of laterally spaced ears 62. Affixed to the plate 56 is a post 64 which mounts a stud 66. Slidably fitted over the stud 66 is a member 68 provided with a pair of ears 70. A pin 72 extends through the ears 70 and connects corresponding ends of a pair of laterally spaced links 74. A pin 76 extending through the ears 62 connects a link 78 with the member 60. The links 74 and 78 are interconnected by a pin 80 which also extends through the bifurcated upper end portion of a link 82. The lower end portion of the link 82 is connected by a pin 84 to a link 86, an intermediate portion of which is connected by a pin 88 to a support 90 underlying the plate 56. A pin 92 connects the link 86 with the upper end of a piston rod 94 which works in a cylinder 96 carried by a support 98 affixed to one of the plates 54.

At a predetermined time after the mold is opened and the workpiece shaped and cured therein is removed from the lower mold section 26, fluid pressure is supplied to one end of the cylinder 96 for extending the rod 94, whereupon the link 86 is rocked about the pin 88, thereupon lowering the link 82 and the pin 80. As the pin 80 is lowered, the links 74 and 78 spread the members 60 and 68. The member 68 shifts axially along the stud 66, toward the post 64. The member 60 moves toward the lower mold section 26, thrusting the end of the pin 58 into the mold cavity, designated 100. When the axis of the pin 80 is lowered to a point just below the axis of the pin 58 and the stud 66, further downward movement is prevented by engagement of the upper end of the rod 94 with the underside of the plate 56.

The fluid pressure is supplied to the cylinder 96 for maintaining the end of the pin 58 in the mold cavity until after the mold has been recharged with powdered material and the material pressed into shape and cured, whereupon the fluid pressure is removed. Fluid pressure is then applied to the other end of the cylinder 96 for retracting the rod 94, whereupon the link 86 is rocked about the pin 88 in the opposite direction, thereby raising the link 82 and the pin 80. As the pin 80 is raised, the links 74 and 78 and the members 60 and 68 move back to their initial positions. As the member 60 moves back, it withdraws the pin 58 from the cavity 100, as a consequence of which the workpiece, having a recess therein formed by the end of the pin 58, is released for ejection from the lower mold section 26. It will be understood that the number, shape and arrangement of pins 58 carried by the member 60 is optional, and that the pullout mechanism described may be used for the purpose intended whether the workpiece remains in the upper mold section or the lower mold section when the mold is opened. When the workpiece remains in the upper mold section, the pin 58 is withdrawn from the mold cavity 100 just before the mold is opened, in order to allow withdrawal of the workpiece from the mold cavity 100. When the workpiece remains in the lower mold section, the pin 58 is withdrawn from the mold cavity 100 just before the bottom knockout pins act to eject the workpiece from the mold cavity 100.

Figure 9:
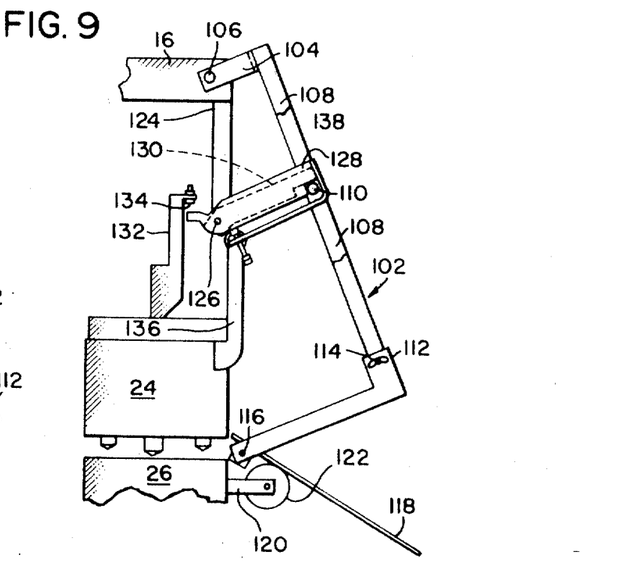
Figure 10:
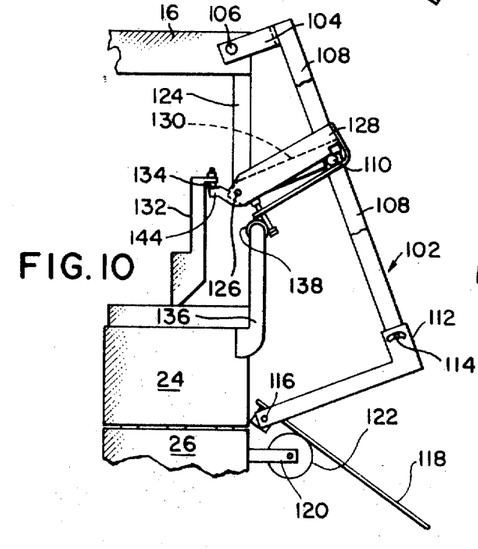
Figure 11:
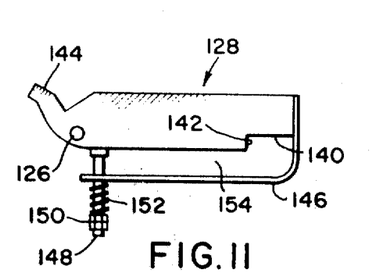
FIGS. 11 and 12 are enlarged side views of latch bars, shown alone.
Figure 12:
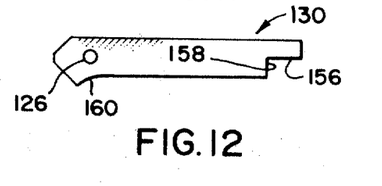

Now referring particularly to FIGS. 5 to 12, the molding press is further provided with novel means for receiving work ejected from the upper mold section and discharging the same from the press. A frame, generally designated 102, is provided with a bracket 104 pivoted, as at 106, to the top plate 16. Depending from the bracket 104 are a pair of laterally spaced frame members 108 interconnected by a horizontally extending latch rod 110. At the lower end of the frame 102 are a pair of laterally spaced arms 112 respectively affixed to the bars 108 by means of suitable pin and slot connections 114 and interconnected by means of a pivot rod 116 which supports one end of a pan 118. Extending from the frame of the machine is a bracket 120 which supports a pair of axially spaced rollers 122 upon which rests the other or free end of the pan 118. Depending from the top plate 16 is a bracket 124 carrying a horizontally extending pivot rod 126 upon which are mounted a pair of latch bars 128 and 130. Mounted upon the upper mold section 24 is a bracket 132 carrying a downwardly presenting pin 134 and a bracket 136 carrying a roller 138. Referring particularly to FIG. 11, the latch bar 128 is provided with a notch 140 having a shoulder 142 and with a tail piece 144. Depending from the free end of the latch bar 128 is a strap 146 which extends back under the bar 128 in underlying spaced relation thereto. Depending from the bar 128 is a stud 148 on the end of which is threaded a nut 150 providing a seat for a compression spring 152. The latch rod 110 passes through the space 154 between the bar 128 and the strap 146, as shown. Now referring particularly to FIG. 12, the free end of the latch bar 130 is provided with a notch 156 having a shoulder 158. The undersurface, at the pivoted end of the bar, is provided with a cam surface 160. It will be noted that the effective length of the latch bar 128, i.e., the distance from the pivotal axis and the shoulder 142, is greater than the effective length of the latch bar 130, i.e., the distance from the pivotal axis and the shoulder 158.

Figure 5:
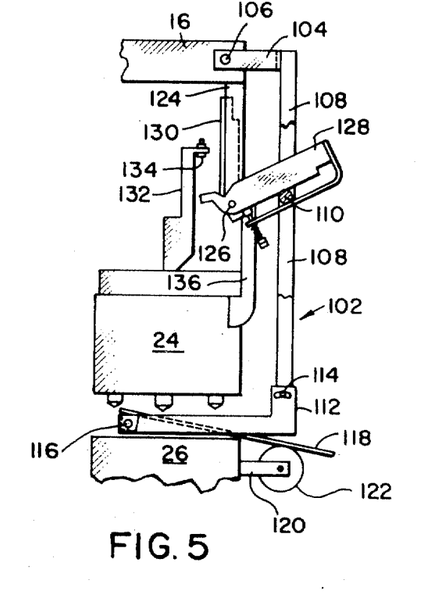
FIG. 5 is a diagrammatic view showing the workpiece ejector mechanism in working position.

Referring particularly to FIG. 5, the upper mold section 24 is partially raised and work shaped and formed in the mold is about to be ejected from the upper mold section 24. The frame 102, freely suspended from the pivot 106, is disposed in work receiving position, i.e., with the pan 118 inserted between the upper and lower mold sections, in position for receiving work ejected from the upper mold section. Latch bar 128 is disposed in a non-working position in which the undersurface thereof is seated upon the latch rod 110, with the notched free end portion thereof overhanging the rod 110. The latch bar 130 extends vertically from the pivot 126 and is held in this raised, non-working position by roller 138. The upper mold section 24 being partially raised, the pin 134 is disposed in overlying spaced relation to the tail 144 of the latch bar 128.

Figure 6:
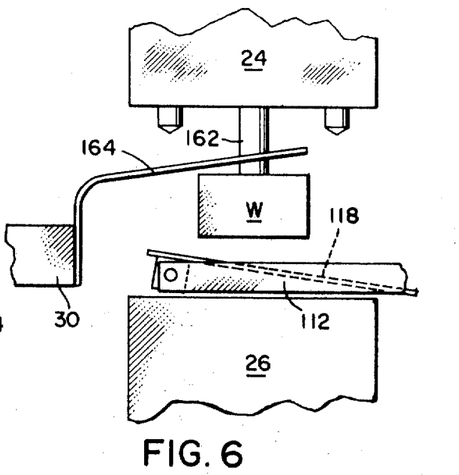
FIG. 6 is an enlarged view showing the mold open and the feeder carriage partially advanced and about to strip a workpiece from knockout pins associated with the upper mold section.
Figure 7:
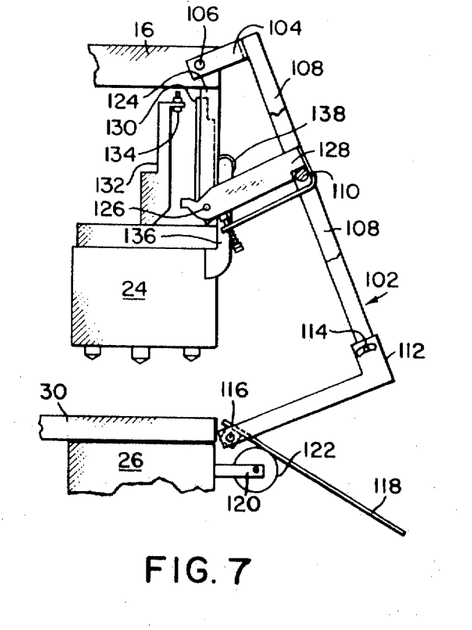
FIGS. 7 to 10 are similar to FIG. 5, but show several different conditions which develop during the cycle of the molding press.

Now referring particularly to FIG. 6, as the mold opens, top knockout pins, designated 162, eject a workpiece W from the upper mold section 24. At the same time, the feeder carriage 30 moves forwardly, carrying a rake member 164, the fingers of which extend upwardly and forwardly. As the rake member advances, the fingers thereof straddle the knockout pins 162 and strip the workpiece W from the knockout pins, whereupon the work drops onto the pan 118. The feeder carriage continues to advance until it engages the proximate end of the pan 118, whereupon it pushes the pan 118 forwardly to the non-working or mold clearing position shown in FIG. 7. The pan 118 passes over the rollers 122 and is tilted sharply for discharge of the work therefrom. At the same time, the frame 102 swings forwardly and upwardly about the pivot 106, and as it does so the rod 110 slides forwardly along the bottom of the latch bar 128 and finally lodges in the notch 140, resting against the shoulder 142. Thus the frame 102 is latched in non-working or mold clearing position. As the feeder carriage 30 approaches the end of its traverse, it registers with the lower mold section and reloads the same with a fresh charge of powdered material. In advancing from the position shown in FIG. 6 to that shown in FIG. 7 the feeder carriage passes under the knockout pins 162.

Figure 8:
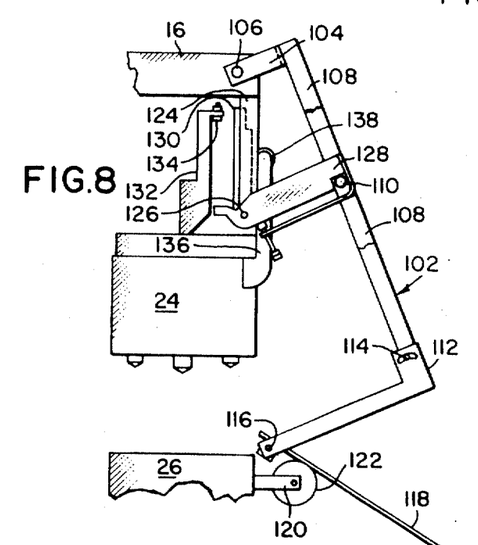

Referring particularly to FIG. 8, immediately after the mold is reloaded, the feeder carriage is retracted to its initial position for receiving another load of powdered material for use in the next machine cycle.

The workpiece having been shaped, cured and discharged from the press, the mold having received a fresh charge of powdered material and the feeder carriage having been retracted, the mold now closes. Referring to FIG. 9, as the upper mold section descends, the roller 138 engages the cam surface 160 and turns the latch bar 130 downwardly to a position wherein the notched free end portion thereof rests upon the rod 110, with the shoulder 158 in rearward spaced relation to the rod 110, as shown. It will be noted that the mold is not fully closed, and in this condition of the press, the pin 134 is not engaged with the tail 144 of the latch bar 142.

Now referring to FIG. 10, the mold is closed tight. In moving from the position of FIG. 9 to that of FIG. 10, the pin 134 engages the tail 144 and swings the latch bar 128 upwardly until the strap 146 engages the rod 110, whereupon the rod 110 is disengaged from the notch 140 of the latch bar 128. Thereupon the rod 110 slides under the latch bar 128 and nests in the notch 156 of the latch bar 130, against the shoulder 158.

After the fresh charge of powdered material is shaped and cured, the mold is opened again. As soon as the upper mold section begins to rise, the pin 134 releases the tail 144 of the latch bar 128. Shortly thereafter, the roller 138 engages the latch bar 130, raising it to its initial position, whereupon the frame 102 is unlatched and released for return to its work receiving position under the influence of gravity. When the frame 102 reaches its work receiving position, the molding press has completed a cycle and is again in the condition thereof shown in FIG. 5.

While in accordance with the provisions of the patent statutes, I have illustrated and described the best form or embodiment of my invention now known to me, it will be apparent to those skilled in the art that changes may be made in the form of the structure described without departing from the spirit and scope of the invention as set forth in the appended claims.

I claim:
1. In a molding press, the combination comprising
(A) a main frame assembly including a stationary base member,
(B) a movable member overlying said base member,
(C) a mold including
   (1) a lower section carried by said base member, and
   (2) an upper section carried by said movable member, said movable member being operable for opening and closing said mold,
(D) an auxiliary frame assembly including
   (1) a first section carried by said movable member including a cross member disposed in lower spaced relation to said base member,
   (2) a second section interconnected with said first section including a cross member disposed intermediate said base member and the cross member of said first section,
   (3) upstanding knockout pin means mounted upon said second section, and
   (4) compression spring means interposed between said cross members, the clear distance between said cross members being greater than the fully extended length of said compression spring means whereby to provide for some lost motion before said spring means is compressed, and
(E) means for actuating said movable member and first auxiliary frame section whereby to first take up said lost motion and then actuate said second auxiliary frame section thereby to raise said knockout pin means for dislodging work from said lower mold section.

2. In a molding press, the combination comprising
(A) a main frame assembly including a stationary base member,
(B) a movable member overlying said base member,
(C) a mold including
   (1) a lower section carried by said base member, and
   (2) an upper section carried by said movable member, said movable member being operable for opening and closing said mold,
(D) an auxiliary frame assembly including
   (1) a first section carried by said movable member including
      (a) a pair of laterally spaced frame members extending downwardly from said movable member through said base member for guidance thereby, and
      (b) a cross member interconnecting said pair of laterally spaced frame members and disposed in lower spaced relation to said base member,
   (2) a second section interconnected with said first section by a lost motion connection including
      (a) a second pair of laterally spaced frame members having longitudinally spaced portions respectively extending through said base member and the cross member of said first section for guidance thereby, and
      (b) a cross member interconnecting said second pair of laterally spaced frame members and disposed intermediate said base member and the cross member of said first section,
   (3) upstanding knockout pin means mounted upon said second section, and
   (4) compression spring means interposed between said cross members, and
(E) means for actuating said movable member and first auxiliary frame section whereby to first take up said lost motion and then actuate said second auxiliary frame section thereby to raise said knockout pin means for dislodging work from said lower mold section.

3. The combination according to claim 2 wherein the pair of laterally spaced frame members of the first auxiliary frame section depend from the movable member and slidably extend through the base member, said base member and the cross member of the first auxiliary frame section slidably receive the pair of laterally spaced frame members of the second auxiliary frame section, the second auxiliary frame section carries a knockout plate overlying said base plate, and the compression spring means are carried respectively by the pair of laterally spaced frame members of the second auxiliary frame section, being seated upon the cross member of said first auxiliary frame section.

4. In a molding press, the combination comprising
(A) a main frame assembly inclluding a stationary base member,
(B) a movable member overlying said base member,
(C) a mold including
   (1) a lower section carried by said base member, and
   (2) an upper section carried by said movable member, said movable member being operable for opening and closing said mold,
(D) an auxiliary frame assembly including
   (1) a first section carried by said movable member and shiftable relative thereto including a cross member disposed in lower spaced relation to said base member,
   (2) yieldable means securing said movable member and first section against relative movement,
   (3) downwardly presenting knockout pin means mounted upon said first section for movement therewith,
   (4) a second section interconnected with said first section including a cross member disposed intermediate said base member and the cross member of said first section, and
   (5) compression spring means interposed between said cross members, the clear distance between said cross members being greater than the fully extended length of said compression spring means whereby to provide for some lost motion before said spring means is compressed, and
(E) means for raising said movable member and first auxiliary frame section a predetermined distance together as a unit and thereafter raising said movable member farther independently of said first auxiliary frame section against the influence of said yieldable means whereby to raise said upper mold section relative to said knockout pin means, thereby to dislodge work from said upper mold section.

5. In a molding press, the combination comprising
(A) a main frame assembly including a stationary base member,
(B) a movable member overlying said base member,
(C) a mold including
   (1) a lower section carried by said base member, and
   (2) an upper section carried by said movable member, said movable member being operable for opening and closing said mold,
(D) an auxiliary frame assembly including
   (1) a first section carried by said movable member including
      (a) a pair of laterally spaced frame members shiftable relative to said movable member and extending through said base member for guidance thereby,
      (b) a cross member interconnecting said pair of laterally spaced frame members and disposed in lower spaced relation to said base member, (2) yieldable means securing said movable member and first section against relative movement, (3) downwardly presenting knockout pin means mounted upon said first section for movement therewith, (4) a second section interconnected with said first section by a lost motion connection including (a) a second pair of laterally spaced frame members having longitudinally spaced portions respectively extending through said base member and the cross member of said first section for guidance thereby, and (b) a cross member interconnecting said second pair of laterally spaced frame members and disposed intermediate said base member and the cross member of said first section, and (5) compression spring means interposed between said cross members, and (E) means for raising said movable member and first auxiliary frame section a predetermined distance together as a unit and thereafter raising said movable member farther independently of said first auxiliary frame section against the influence of said yieldable means whereby to raise said upper mold section relative to said knockout pin means, thereby to dislodge work from said upper mold section.

6. The combination according to claim 5 wherein the knockout pin means is disposed close under the movable member, the pair of laterally spaced frame members of the first auxiliary frame section depend from the movable member and slidably extend through said movable and base members, the yieldable means securing said first auxiliary frame section and said movable member against relative movement are operatively interposed between the upper end portions of said pair of laterally spaced frame members of the first auxiliary frame section and said movable member, said base member and the cross member of the first auxiliary frame section slidably receive the pair of laterally spaced members of the second auxiliary frame section, and the compression spring means are carried respectively by the pair of laterally spaced frame members of the second auxiliary frame section, being seated upon the cross member of said first auxiliary frame section.

References Cited

UNITED STATES PATENTS

| 2,272,718 | 2/1942 | MacLogan et al. | 249—67 |
|---|---|---|---|
| 2,338,491 | 1/1944 | Cutler | 18—16.5 |
| 2,457,336 | 12/1948 | Wilson | 18—42 D |
| 2,582,891 | 1/1952 | Strauss | 18—2 RC X |
| 2,837,765 | 6/1958 | Harvey | 18—16 F |
| 3,132,379 | 5/1964 | Crane | 18—16.5 |
| 3,154,812 | 11/1964 | Haller | 18—16.7 |
| 3,203,049 | 8/1965 | Brown et al. | 18—176 |
| 3,317,961 | 5/1967 | Drevalos et al. | 18—42 D X |
| 3,362,046 | 1/1968 | Blumer | 18—2 R P X |
| 3,452,121 | 6/1969 | Cochardt | 18—Magnet Dig. |

J. HOWARD FLINT, Jr., Primary Examiner

U.S. Cl. X.R.

18—2 R P: 249—68